(12) United States Patent
Das Sharma et al.

(10) Patent No.: US 6,832,270 B2
(45) Date of Patent: Dec. 14, 2004

(54) VIRTUALIZATION OF COMPUTER SYSTEM INTERCONNECTS

(75) Inventors: Debendra Das Sharma, Santa Clara, CA (US); Ashish Gupta, San Jose, CA (US)

(73) Assignee: Hewlett-Packard Development Company, L.P., Fort Collins, CO (US)

( * ) Notice: Subject to any disclaimer, the term of this patent is extended or adjusted under 35 U.S.C. 154(b) by 423 days.

(21) Appl. No.: 10/092,603

(22) Filed: Mar. 8, 2002

(65) Prior Publication Data

US 2004/0078647 A1 Apr. 22, 2004

(51) Int. Cl.[7] .............................................. G06F 3/00
(52) U.S. Cl. .............................. 710/15; 710/19; 714/3; 370/228
(58) Field of Search ........................ 710/3, 4, 9, 14–19, 710/36, 38, 51, 260, 306, 312, 314; 714/3–8; 370/227, 228

(56) References Cited

U.S. PATENT DOCUMENTS

| | | | | | |
|---|---|---|---|---|---|
| 5,276,823 | A | * | 1/1994 | Cutts et al. ................... | 714/11 |
| 5,784,625 | A | * | 7/1998 | Walker ........................ | 710/260 |
| 6,496,940 | B1 | * | 12/2002 | Horst et al. .................... | 714/4 |
| 6,717,909 | B2 | * | 4/2004 | Leroux et al. .............. | 370/228 |
| 6,742,136 | B2 | * | 5/2004 | Christensen et al. ........... | 714/5 |

* cited by examiner

Primary Examiner—Khanh Dang

(57) ABSTRACT

A virtual input/output (I/O) interconnect mechanism, and a corresponding method, for use in a computer system having a plurality of I/O devices and a plurality of processing units, where I/O devices and processing units are coupled by one or more bridge units, includes an address decode block having a multiplexer that multiplexes inputs to produce an address, where the address relates to a transaction related to a processor unit, a range register decoder that receives the address and provides a destination address of a module to receive the transaction related to the address, and a reroute module identification block that receives the destination address. The reroute module identification block, includes an original module identification that provides an address of one or more original modules in the computer system, and a remapped module identification that provides logical destination module identifications of substitute modules in the computer system, where a substitute module replaces functions of an original module in the computer system.

26 Claims, 6 Drawing Sheets

VIRTUALIZATION OF COMPUTER SYSTEM INTERCONNECTS

TECHNICAL FIELD

The technical field of computer systems having redundant subsystems and components.

BACKGROUND

Current multi-processor computer systems are typically supplied with one or more redundant or spare devices that can be used in the event of failure of the primary device. For example, a computer system may come equipped with two ethernet cards so that upon failure of the first ethernet card, the second (spare) card can be used with no, or minimum computer downtime. To provide adequate redundancy, these current computer systems may include spare devices for each of multiple partitions into which the computer system is divided. Thus a computer system with three partitions may include one primary and one spare device for each of the three partitions. This arrangement of primary and spare devices adds to the cost of the computer system and places additional space constraints on the computer system layout.

SUMMARY

A method and a mechanism are described herein that are capable of generating a virtual hardware path to allow transactions addressed to a failed computer system component to be claimed by a substitute computer system components. In an embodiment, the components are input/output (I/O) devices, such as ethernet cards, or other I/O devices. However, the method and mechanism may be adapted for use by computer components other than I/O devices.

The original and the substitute components are preferably of a same type. The substitute component may be currently used for other computer system functions (i.e., the substitute component is active in the computer system). Alternatively, the substitute component may be inactive, such as an installed spare, for example.

In an embodiment, hardware is used to make a path to/from a failing or failed component look identical to a path to/from a substitute component. The same physical path to/from the failed component is maintained, but a virtual path is established for the substitute component. Software may then be used to suspend activities to/from the failed component, reconstruct a state of the failed component in the substitute component, and resume operation on the substitute component. Then, all transactions or activities for the failed component will go to the substitute component. To ensure this transfer, address translation mapping is invoked using a set of range registers. When a processor generates an address that goes to a component, the address is checked against the range registers to determine which component the transaction should be routed to. If the transaction needs to be rerouted because of a component failure, a map table will indicate the reroute distinction address pointed to by the range registers.

In particular, identification information for the original (failed) and the substitute components may be stored in a reroute module identification block, and the identification information may be related, such as by use of the map table, for example, so that when an original component fails, the appropriate substitute component may be identified by reference to the reroute module identification block. The substitute component includes programming used to claim transactions addressed to the failed component, and to copy a state of the failed component to the substitute component.

In an embodiment, a virtual input/output (I/O) interconnect mechanism for use in a computer system having a plurality of I/O devices and a plurality of processing units, where I/O devices and processing units are coupled by one or more bridge units, includes an address decode block having a multiplexer that multiplexes inputs to produce an address, where the address relates to a transaction related to a processor unit, a range register decoder that receives the address and provides a destination address of a module to receive the transaction related to the address, and a reroute module identification block that receives the destination address. The reroute module identification block includes an original module identification that provides an address of one or more original modules in the computer system, and a remapped module identification that provides logical destination module identifications of substitute modules in the computer system, where a substitute module replaces functions of an original module in the computer system.

In an embodiment, a method for substituting operating components for failed components in a computer system includes the steps of detecting a failed component, and determining if a component of a same type as the failed component exists. If a substitute component exists, the method includes suspending all activities, such as direct memory access going to or coming from the failed component, copying a state of the failed component to the substitute component, deconfiguring the failed component, updating reroute module identification to remap a hardware path for the failed component to the substitute component, updating configuration registers of the substitute component, and resuming activities such as direct memory access to the failed component. If a substitute component does not exist, the method invokes an error handler.

DESCRIPTION OF THE DRAWINGS

The detailed description will refer to the following figures, in which like numbers refer to like elements, and in which.

DETAILED DESCRIPTION

Modern computer system may include several like components that can serve as substitutes for each other. For example, a computer system may have four components of type A and four components of type B. All the four type A components may be in use during routine computer system operation, that is, there are no "spare" type A components. For the type B components, three may be in use during routine computer operation and a fourth Type B component may be an installed spare. Should one of the four type A components fail, one or more of the remaining type A components may be available to substitute for the failed type A component. Should one of the type B components fails, the installed spare type B component may be available as a substitute.

Figure 1:
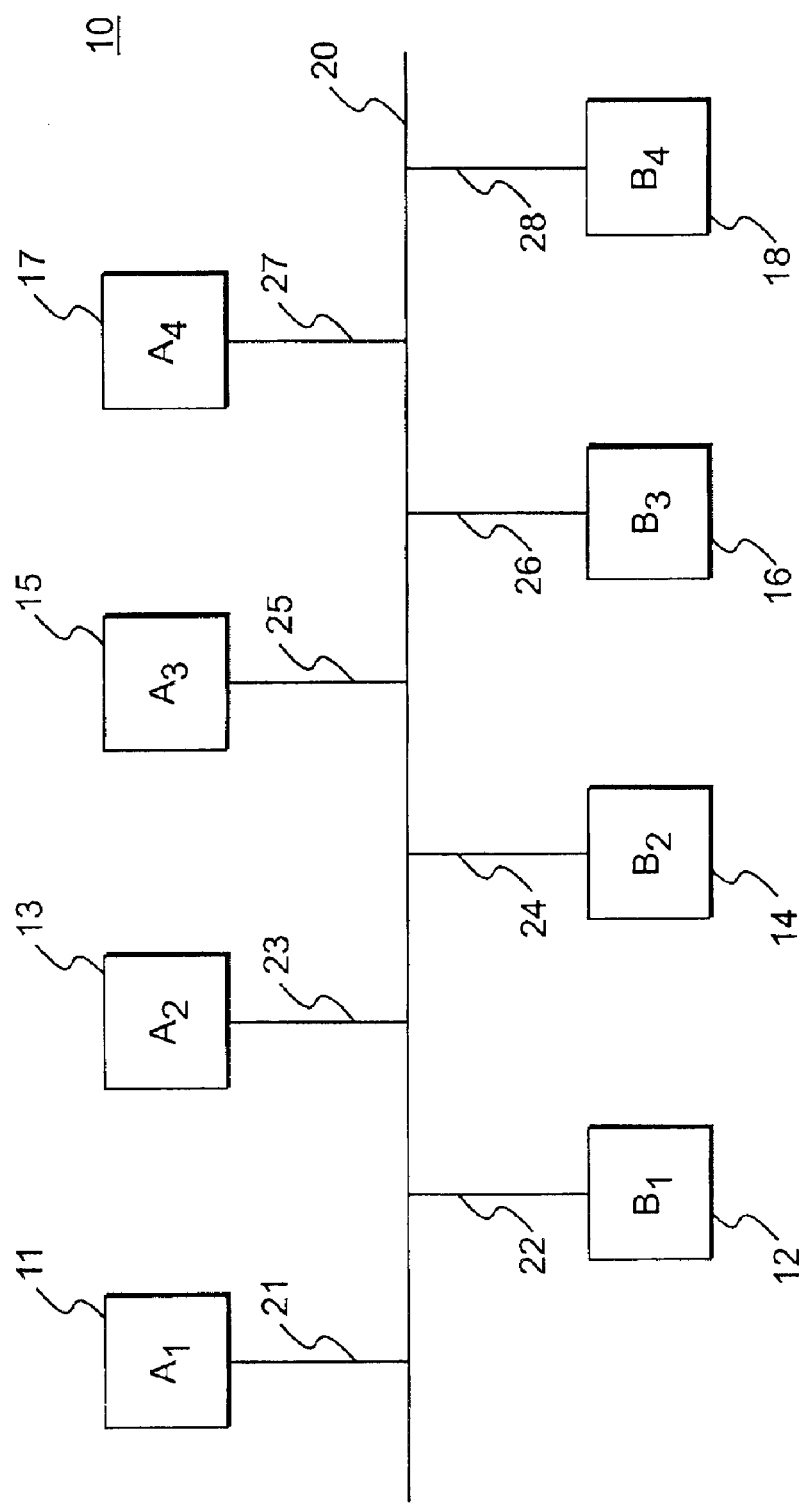
FIG. 1 is a diagram of a computer system employing redundant components.

FIG. 1 illustrates a computer system 10 having four type A components and four type B components. The type A and B components are coupled to other components (not shown) of the computer system 10 by the interface connection 20. The four type A components and all but component 18 of the type B components are used during normal operation of the computer system 10. Should component 11, for example, fail, then component 13 (or components 15 or 17) may be substituted for the component 11. Should component 12 fail, the component 18 may be substituted for the component 12. Alternatively, or in addition, components 14 or 16 may be substituted for the failed component 12.

To substitute one component for another component, a hardware path from the failed component may be defined, and a hardware path for the substitute component may be made to look identical to the hardware path of the failed component. Then, any transactions intended for the failed component will be directed to the substitute component. Thus, should the component 11 fail and the component 13 be designated as the substitute, then path 23, 20 to the component 13 is made to look identical to path 21, 20 to the component 11. This concept will be referred to hereafter as virtualization.

Failure of one of the type A or B components may be detected during an attempted direct memory access (DMA), for example, that fails. A hardware failure detection system (not shown) of the computer system 10 may detect the DMA failure, and may invoke an algorithm that completes the substitution of one component for another component. Besides substituting for failed components, component substitution, and vinalization, may occur for other reasons, such as periodic preventive maintenance in which all components of a type are removed and either inspected, repaired if needed and replaced, or simply replaced by a new component of that type.

Figure 2A:
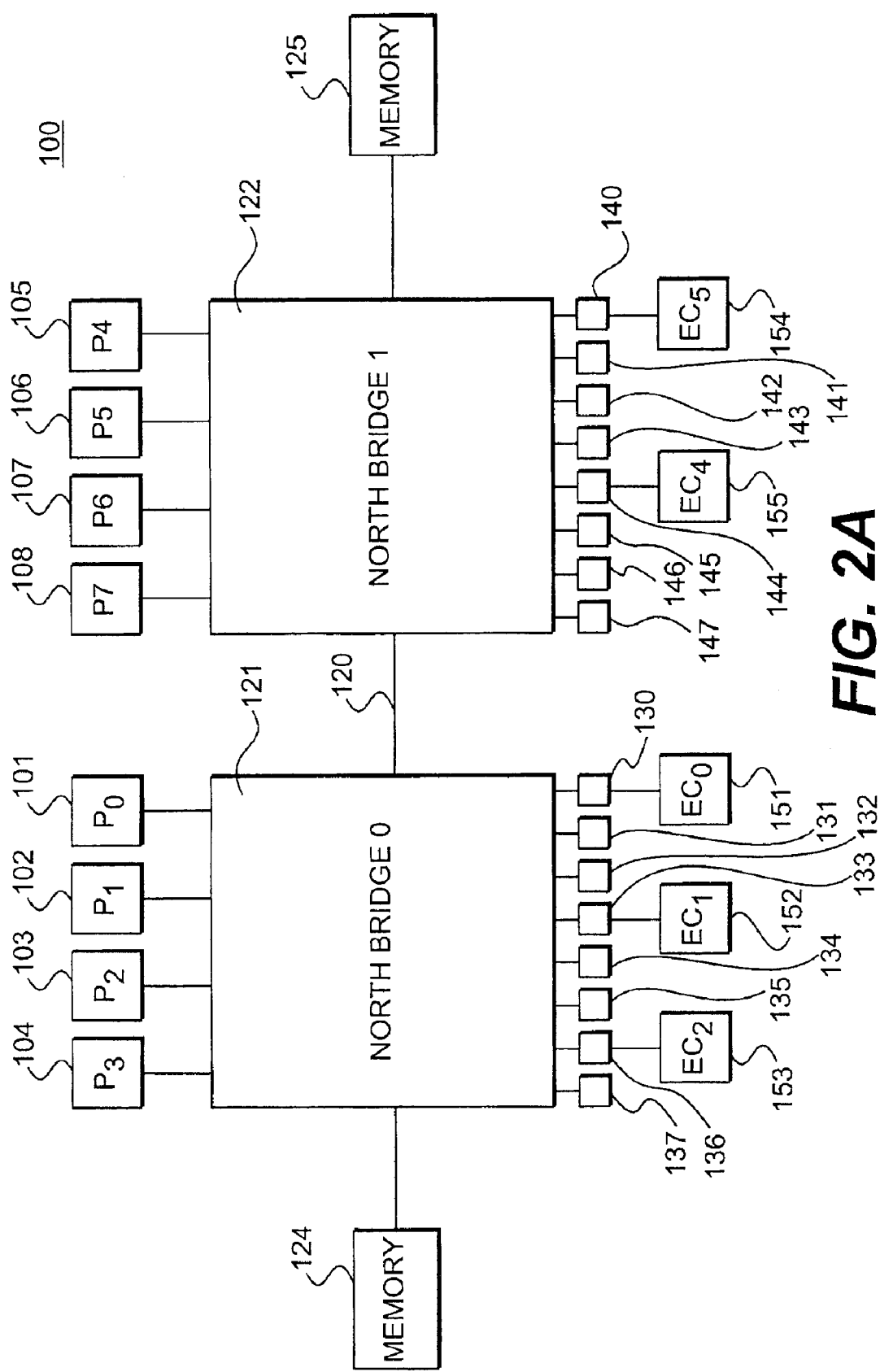
FIG. 2A is a diagram of a multiprocessor computer system that uses virtualization of input/output (I/O) interconnects to provide redundancy in the event of an I/O card failure.

FIG. 2A is a more detailed example of a computer system in which virtualization is used. A computer system 100 includes eight central processing units (CPUs) 101–108. Each of the CPUs 101–108 is coupled to either a north bridge 121 or 122 as shown. The north bridges 121 and 122 are connected by a scalable interface 120. Also coupled to the north bridges 121 and 122 are memory 124 and memory 125. Finally coupled to the north bridge 121 are south bridges 130–137 and coupled to the north bridge 122 are south bridges 140–147. Coupled to the south bridges 140, 144, 130, 132, and 136 are ethernet cards 154, 155, 151, 152, and 153, respectively.

Figure 2B:
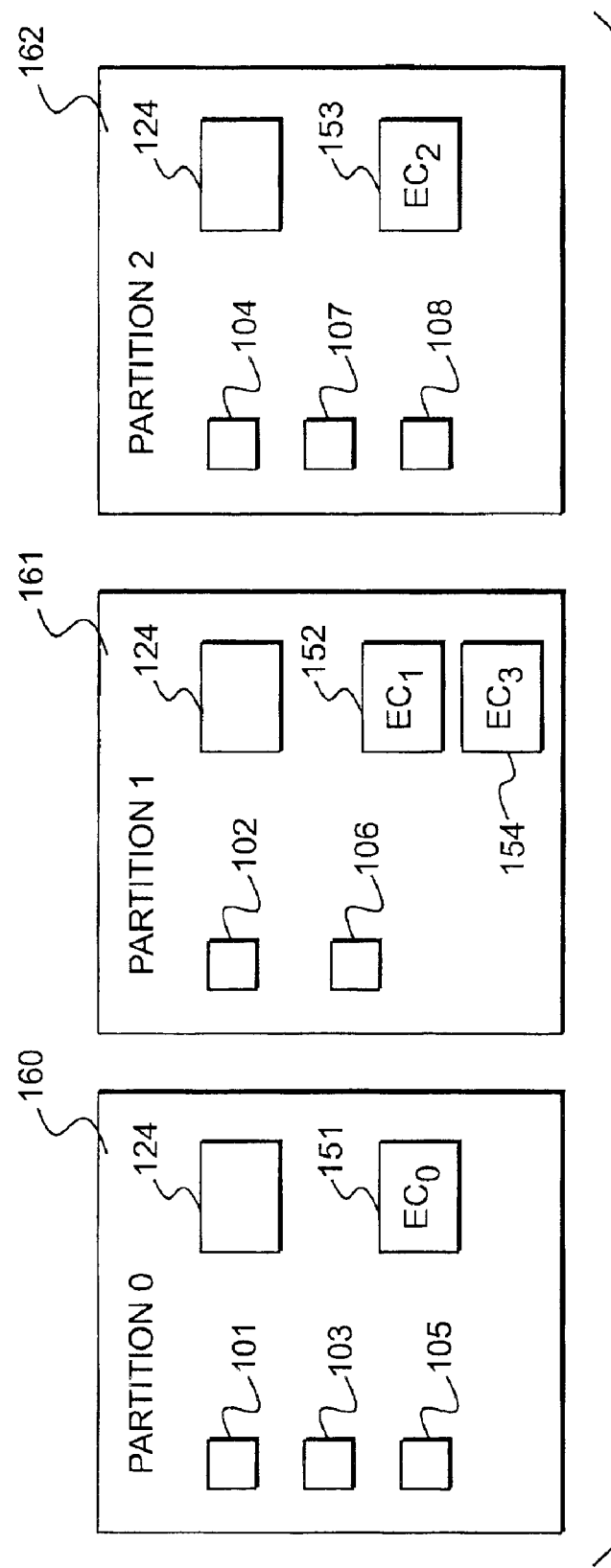
FIG. 2B illustrates a possible partitioning scheme to be used with the system of FIG. 2A.

The various hardware components shown in FIG. 2A may be partitioned according to one of several schemes. Partitioning of hardware components in a computer system is a well-known technique for optimizing computer system performance. By way of example, FIG. 2B shows one possible partitioning scheme. Partition 0 (160) includes the CPUs 101, 103, 105, some memory 124, ethernet card 151, and other hardware components (not shown) such as other input/output (I/O) cards and other components. Partition 1 (161) includes the CPUs 102, 106, some memory 124, the ethernet cards 152, 154, and other hardware components, including other I/O cards (not shown). Partition 2 (162) includes the CPUs 104, 107, 108, some memory 124, the ethernet card 153, and other hardware components, including other I/O cards (not shown). The ethernet card 155 is not assigned to any specific partition.

Referring now to both FIGS. 2A and 2B, a virtualization implementation (method and apparatus) will be described in detail. The description will refer specifically to virtualization of I/O cards (and more specifically, virtalization of ethernet cards). However, other hardware components of the computer system 100 may also use virtualization to substitute one component for another like component. In a particular example, the ethernet card 152 fails. To replace the functions of the failed ethernet card 152, the ethernet card 154 may be substituted by making a hardware path from the ethernet card 154 look identical to the hardware path for the failed ethernet card 152. That is, the ethernet card 154 is "virtualized" so that to other components of the computer system 100, the ethernet card 154 appears to be coupled to the north bridge 121 and the south bridge 133. This means that any transaction going to the ethernet card 152 will be routed to the ethernet card 154. In addition, address ranges assigned to the ethernet card 152 will be claimed by the ethernet card 154. Thus, when a CPU generates an address to the ethernet card 152, the north bridges 121 and 122 will substitute the ethernet card 154 as the destination rather than the ethernet card 152. If a peer-to-peer transaction needs to be routed to the ethernet card 152, the north bridges 121 and 122 will route the peer-to-peer transfer to the ethernet card 154. In addition, the ethernet card 154 is programmed to claim the address ranges previously assigned to the ethernet card 152. Finally, as will be described later, the state of the ethernet card 152 is copied to the ethernet card 154.

Figure 3:
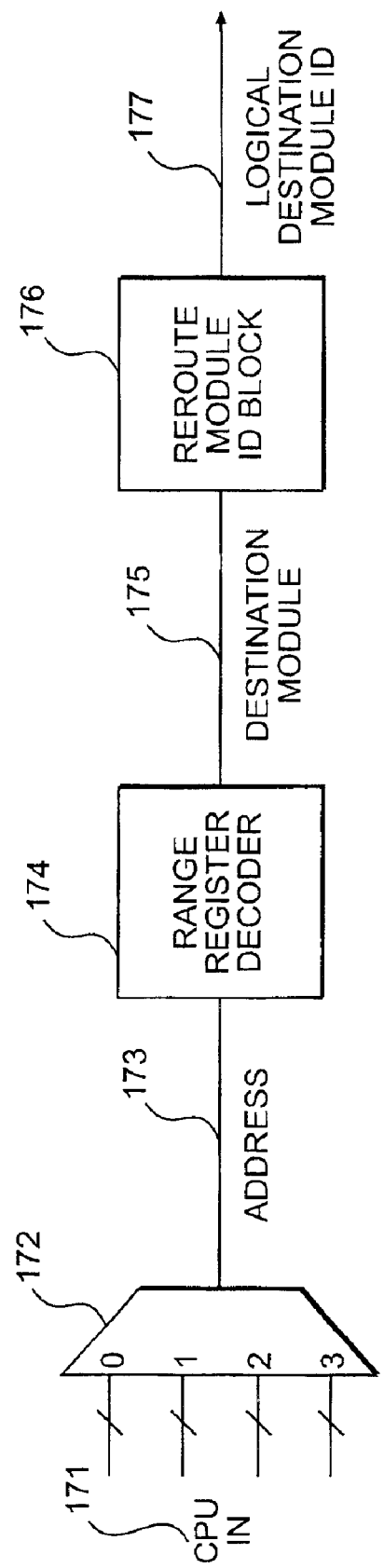
FIG. 3 is a diagram of an address decode block used with the system of FIG. 2A.

FIG. 3 illustrates and address decode block 170 that may be incorporated into the north bridges 121 and 122 to allow for CPU to I/O access and virtualization of the hardware path to the ethernet cards 151–155. At 171, the CPUs 101–104 provide inputs to the north bridge 121, which are multiplexed in multiplexer 172 to produce address 173. The address 173 is then provided to a range register decoder 174. The output of the decoder 174 includes destination (e.g., north bridge, south bridge) 175. The destination 175 is provided to reroute module ID block 176, which in turn provides logical destination ID 177.

Figure 4:
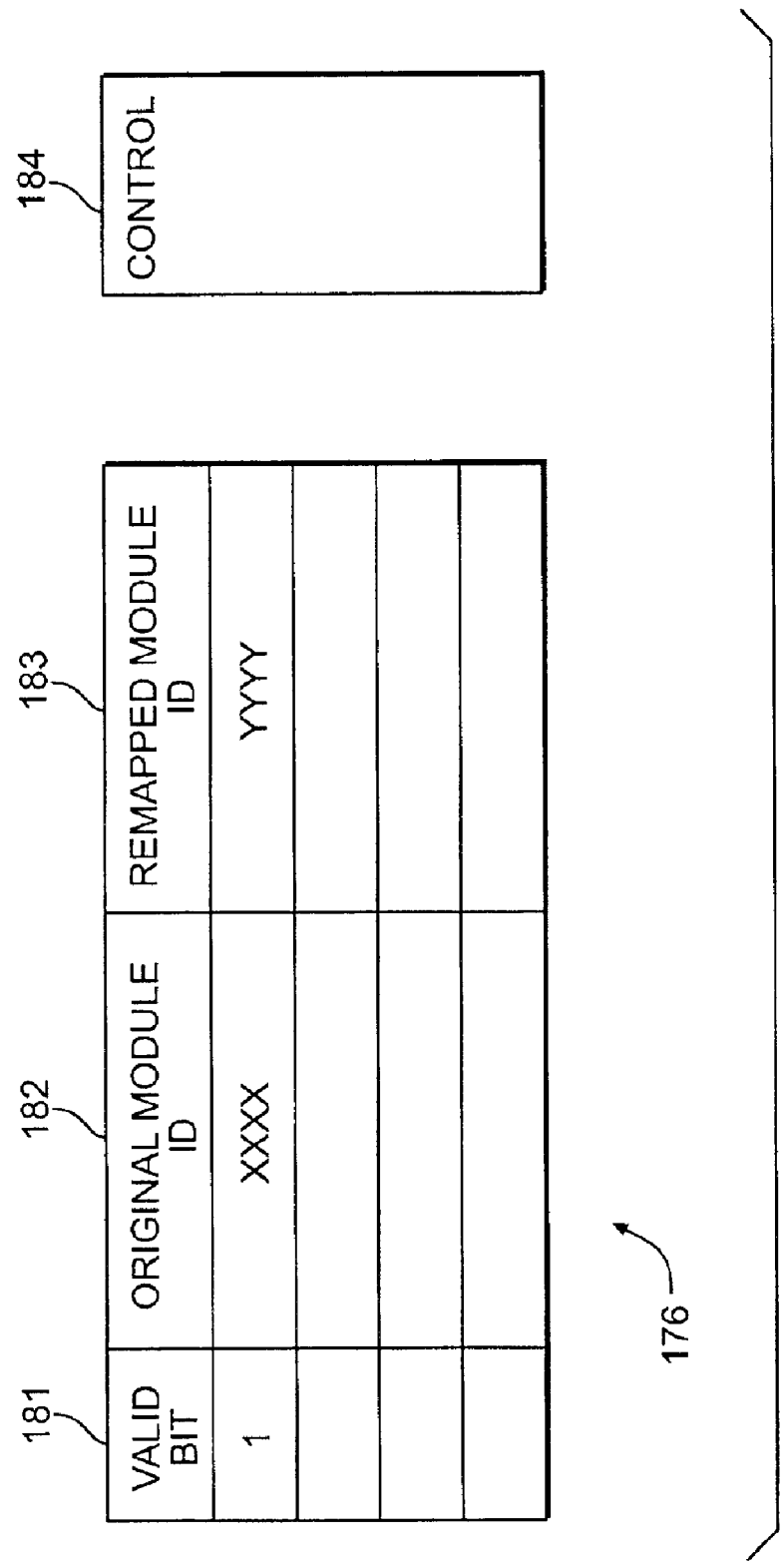
FIG. 4 is a diagram of a reroute module block used with the system of FIG. 2A.

FIG. 4 illustrates the reroute module ID block 176 in detail. The block 176 includes a valid bit column 181, an original module ID section 182, and a remapped module ID section 183. Also shown is a control block 184. The original module ID section 182 contains identification information for one or more of the ethernet cards 151–155. This information identifies the originally functioning ethernet cards. The remapped module ID section 183 includes information that identifies a substitute ethernet card in the event of a failure (or other action requiring replacement) of the originally functioning ethernet cards. The valid bit column 181 indicates (for example, when a bit is set at 1) when a translation from an original, failed ethernet card to a substitute ethernet card is valid.

The reroute module ID block 176 may include several entries. The number of entries will dictate how many interconnects may receive a substitute simultaneously. For example, if the reroute module ID block 176 contains eight entries, that at most eight substitutions, or redirections, may occur at the same time. Each entry contains a valid bit indicating the entry (translation) is valid, the original module ID, and the substitute module ID.

Figure 5:
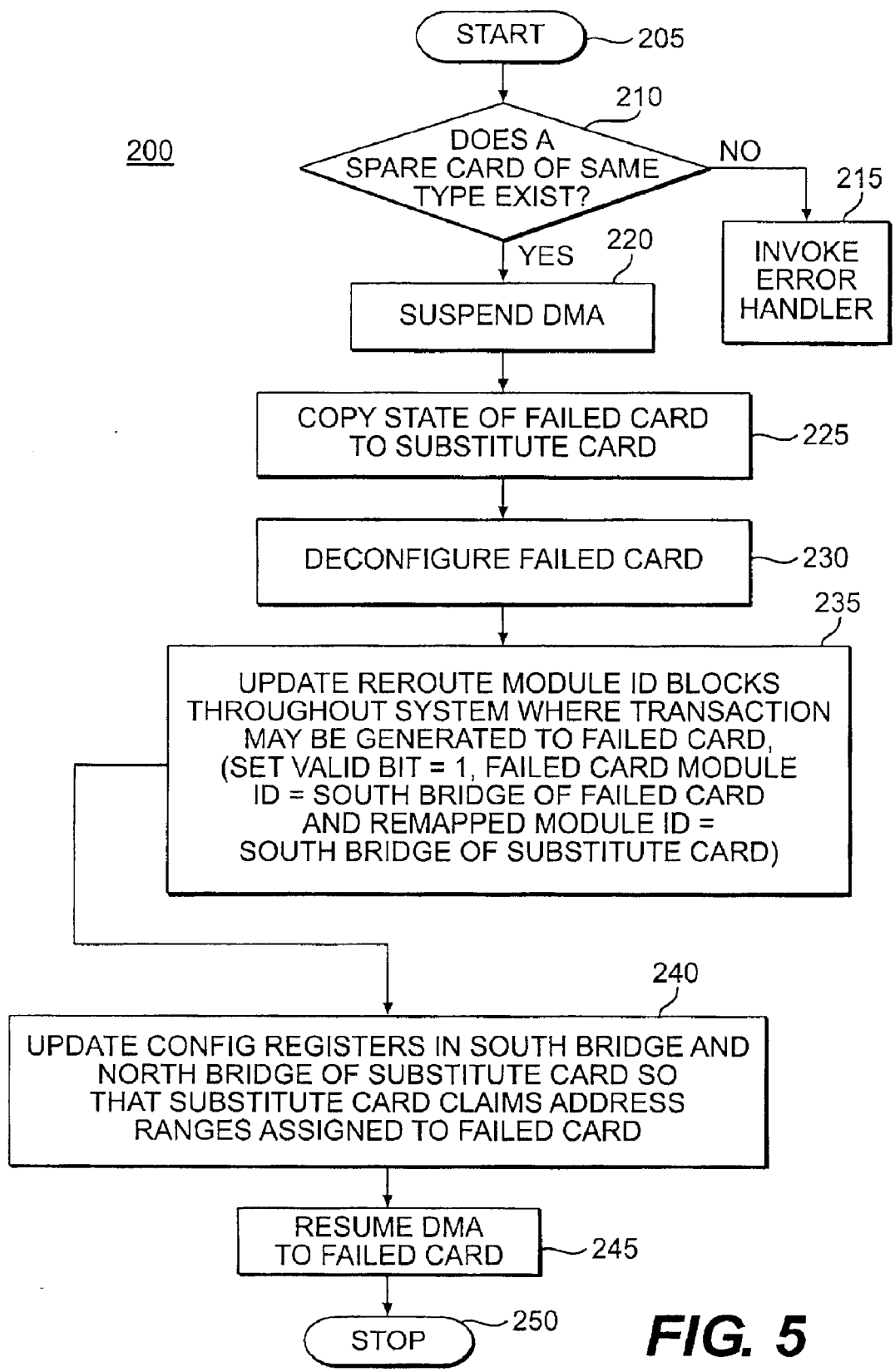
FIG. 5 is a flowchart illustrating hardware path viatualization method.

FIG. 5 is a flowchart showing an 10 virtualization process 200. In FIG. 5, the process 200 relates to virtualization of ethernet cards shown in FIG. 2, and in particular to a failure of the ethernet card 152, which may be replaced by the ethernet card 154. The process 200 begins in block 205. In block 210, the management software determines if a spare ethernet card of the same type as the ethernet card 152 exists and is available. If a spare ethernet card is not available, the process 200 moves to block 215, and an error handler may be invoked. In block 210, if a spare ethernet card is available, the process 200 moves to block 220 with the failure of the ethernet card 152. In the illustrated example, the ethernet card 154 exists and is available to substitute for the failed ethernet card 152. In block 220, the management software suspends DMA. Next, in block 225, the state of the ethernet card 152 is copied to the ethernet card 154. Then, in block 230, the management software deconfigures the ethernet card 152. In block 235, the management software updates the reroute module ID blocks throughout the computer system 100 where a transaction to the ethernet card 152 may be generated. The updating includes setting the valid bit 181 from 0 to 1, setting the original module ID for the ethernet card 152 to the south bridge side of the ethernet card 152, and setting the remapped module ID for the ethernet card 152 to the south bridge side of the ethernet card 154.

In block 240, the configuration registers in the north bridge 122 and the south bridge 144 are updated so that the ethernet card 154 claims the address range originally assigned to the ethernet card 152. In block 245, the management software resumes DMA to the ethernet card 152. In block 250, the process 200 ends.

The failed ethernet card 152 may be repaired and returned to the computer system 100, where the returned ethernet card 152 may serve as a spare ethernet card that can then substitute for a failed ethernet card.

The illustrative embodiments described above refer to substitution, or path virtualization, at the card (module) level. However, the substitution may be performed at levels in the computer system lower than or higher than the card level.

What is claimed is:

1. A virtual input/output (I/O) interconnect mechanism for use in a computer system having a plurality of I/O devices and a plurality of processing units, wherein I/O devices and processing units are coupled by one or more bridge units, the mechanism comprising:
   an address decode block, comprising:
      a multiplexer that multiplexes inputs to produce an address, wherein the address relates to a transaction related to a processor unit,
      a range register decoder that receives the address and provides a destination address of a module to receive the transaction related to the address, and
      a reroute module identification block that receives the destination address, the reroute module identification block, comprising:
         an original module identification that provides an address of one or more original modules in the computer system, and
         a remapped module identification that provides logical destination module identifications of substitute modules in the computer system, wherein a substitute module replaces functions of an original module in the computer system.

2. The mechanism of claim 1, wherein the reroute module identification block further comprises a valid bit indication, the valid bit indication indicating when a translation from the original module to the substitute module is valid.

3. The mechanism of claim 1, wherein the inputs received by the multiplexer are inputs from the plurality of I/O devices.

4. The mechanism of claim 1, wherein the address is an I/O device address.

5. The mechanism of claim 1, wherein the destination address is an address of one of the one or more bridge units.

6. The mechanism of claim 1, wherein the original module and the substitute module are a same type of device.

7. The mechanism of claim 6, wherein the original module and the substitute module are I/O devices.

8. The mechanism of claim 7, wherein the I/O devices are ethernet cards.

9. The mechanism of claim 1, wherein the substitute module comprises programming to claim transactions addressed to the original module.

10. The mechanism of claim 1, wherein a state of the original module is copied to the substitute module.

11. The mechanism of claim 1, wherein the substitute module is an inactive component of the computer system.

12. The mechanism of claim 1, wherein the substitute module is an active component of the computer system.

13. A method for rerouting a transaction along a virtual path from an original module in a computer system to a substitute module in the computer system, wherein a transaction is initiated to the original module, and wherein the original module has failed, the method, comprising:
   storing a remapped module identification that identifies the substitute module as a substitute for the failed original module;
   receiving a transaction for the failed original module, the transaction including an address of the failed original module;
   extracting the address;
   decoding the address to provide an identification of the failed original module for receipt of the transaction;
   comparing the identification of the failed original module to the remapped module identification; and
   rerouting the transaction to the substitute module based on the remapped module identification.

14. The method of claim 13, wherein the original module and the substitute module are input/output (I/O) devices.

15. The method of claim 14, wherein the I/O devices are ethernet cards.

16. The method of claim 13, wherein the substitute module is an active component of the computer system.

17. The method of claim 13, wherein the substitute module is an inactive component of the computer system.

18. The method of claim 13, further comprising copying a state of the failed original module to the substitute module.

19. The method of claim 13, further comprising reprogramming the substitute module to claim transactions addressed to the failed original module.

20. The method of claim 13, further comprising setting a valid bit to indicate if a translation from the original module to the substitute module is valid.

21. A method for creating a virtual hardware path in a computer system, comprising:
   identifying a failed module in the computer system;
   identifying a substitute module in the computer system, the substitute module capable of replacing the failed module;
   storing an identification of the failed module and an identification of the substitute module, wherein the failed module identification is related to the substitute module identification;
   programming the substitute module to receive transactions addressed to the failed module.

22. The method of claim 21, wherein programming the substitute module comprises:

copying a state of the failed module to the substitute module; and programming the substitute module to claim the transactions addressed to the failed module.

23. An apparatus that creates a virtual hardware path in a computer system, comprising:
   a reroute module identification block, comprising:
      an original module identification section, and
      a substitute module identification section, wherein an identification for a failed original module is entered into a space in the original module identification section and an identification for a substitute module is entered in to a space, corresponding to the space in the original module identification section, in the substitute module section; and
   programming adapted to the substitute module, wherein the substitute module is reprogrammed to claim transactions addressed to the failed original module and to copying a state of the failed original module to the substitute module.

24. A method for substituting operating components for failed components in a computer system, comprising:
   detecting a failed component;
   determining if a component of a same type as the failed component exists; and
   if a substitute component exists:
      suspending activities to the failed component,
      copying a state of the failed component to the substitute component,
      deconfiguring the failed component,
      updating reroute module identification to remap the failed component to the substitute component,
      updating configuration registers of the substitute component, and
      resuming activities to the failed component.

25. The method of claim 24, wherein a substitute component does not exist, the method further comprising invoking an error handler.

26. The method of claim 24, wherein the activities include direct memory access.

* * * * *